United States Patent [19]
Baum et al.

[11] Patent Number: 5,381,537
[45] Date of Patent: Jan. 10, 1995

[54] LARGE LOGICAL ADDRESSING METHOD AND MEANS

[75] Inventors: Richard I. Baum; Kenneth E. Plambeck; Casper A. Scalzi, all of Poughkeepsie; Richard J. Schmalz; Bhaskar Sinha, both of Wappingers Falls, all of N.Y.

[73] Assignee: International Business Machines Corporation, Armonk, N.Y.

[21] Appl. No.: 803,320

[22] Filed: Dec. 6, 1991

[51] Int. Cl.$^6$ .................. G06F 12/10; G06F 12/00
[52] U.S. Cl. .................. 395/400; 395/425; 364/DIG. 1; 364/256.4; 364/255.7; 364/258
[58] Field of Search ............. 395/400, 425; 364/255.7, 256.4

[56] References Cited

U.S. PATENT DOCUMENTS

| | | | |
|---|---|---|---|
| 4,285,040 | 8/1981 | Carlson et al. | 395/400 |
| 4,355,355 | 10/1982 | Butwell et al. | 395/400 |
| 4,679,140 | 7/1987 | Gotou et al. | 395/775 |
| 4,792,897 | 12/1988 | Gotou et al. | 315/400 |
| 4,868,740 | 9/1989 | Kagimasa et al. | 395/400 |
| 4,979,098 | 12/1990 | Baum et al. | 395/400 |
| 5,023,773 | 6/1991 | Baum et al. | 395/425 |
| 5,023,777 | 6/1991 | Sawamoto | 395/400 |
| 5,107,417 | 12/1992 | Yokayama | 395/500 |

OTHER PUBLICATIONS

IBM System/370: Principles of Operation; Publication Number GA2214 7000-10; IBM Corp.; Sep. 1987; pp. 3-20 to 3-31.

Primary Examiner—Joseph L. Dixon
Assistant Examiner—Reginald Bragdon
Attorney, Agent, or Firm—Bernard M. Goldman

[57] ABSTRACT

A method and apparatus for translating a large logical address as a large virtual address (LVA) when a dynamic address translation (DAT) mode is on. Each LVA is separated into three concatenated parts: 1. a highest-order part (ADEN) for indexing into an access directory (AD) to locate an entry (ADE) for locating one access list (AL); 2. an intermediate part (ALEN) for indexing into a selected AL to access an entry (ALE) that enables location of an associated conventional address translation table which represents a conventional size virtual address space; and 3. a low-order DAT virtual address (VA) part having the same size as a conventional type of virtual address. The low-order DAT VA part is translated by the associated conventional address translation table. If a carry signal is generated during the creation of the low-order DAT VA part, then a change in the selection of an ALE results. An offset value of ALEs can be utilized to generate an effective ADEN and ALEN, which are utilized for the address translation of the LVA.

15 Claims, 6 Drawing Sheets

LARGE LOGICAL ADDRESSING METHOD AND MEANS

INTRODUCTION

This invention uniquely solves problems caused by increasing the size of logical addresses and the size of virtual and real address spaces used by computer systems, including downward compatibility problems.

BACKGROUND

Locating a virtual address (VA) in real storage is automatically done in a computer system through use of the dynamic address translation (DAT) process. Then a system's real memory space can be allocated independently of how any virtual address space (VAS) is used. Thus use of virtual storage to allow free use of any number of contiguous and large VAS units of up to 2 GB each allows real memory to be allocated without concern about where the real storage is located. Dividing real storage into fixed size units (e.g. 4 KB pages) having the same access time (regardless of where in real storage they are located) allows any VAS to be mapped into real storage as a set of non-contiguous pages scattered anywhere in real storage without affecting system performance in the use of any VAS. This random access characteristic of dynamic RAM (DRAM) or static RAM (SRAM) storage distinguishes its access time from DASD storage in which access time deteriorates due to the intervention of mechanical spin time and arm movement time.

It is known that the size of the virtual address used by a system controls the size of virtual address spaces (VASs) usable by the system, and that the maximum VAS size is equal to 2 to a power equal to the number of bit positions in the address size. For example, an address with 31 bits enables a VAS of $2**31$ bytes.

A VAS is a sequence of virtual addresses (preferably starting from zero up to an upper limit) which conveniently allows a program to locate instructions and/or data without concern for how computer hardware actually locates the instructions or data in a real memory. The software uses the virtual addresses, while the hardware stores or retrieves the content of these virtual addresses in real memory and avoids problems, such as memory fragmentation and discontiguous real storage management, and passes storage management from application programs to the system control program.

It is also known that increasing the virtual address size increases the VAS size, which then contains more bytes of information (data and/or instructions) because of the greater number of available byte addresses.

The maximum size of a virtual address (VA) for which a system is designed is not allowed to be exceeded in the operation of a machine. Increasing the address size above a current maximum size can cause difficult problems to compatibility with prior programs, and to the design of future programs and data bases for a computer system. When the amount of data that should be concurrently addressable exceeds the maximum size of a VAS, the program must contain steps to manipulate multiple VASs.

Some computer systems put operand addresses within instructions, and if the address size were to be increased all instructions would have to be redesigned for the larger address size. Other computer architectures do not suffer from this incompatibility up to some address size limit, such as the IBM S/370 because it does not have its instructions directly contain instruction addresses; but instead the storage operands within the instructions specify general purpose registers (GPRs), containing base (B) and index (X) values, and an address component (D). The well known address arithmetic operation on the B,X,D operand specification obtains the operand address. The S/370 operand architecture is carried over into the IBM ESA/390 system.

The B,X,D operand specification can support any address size providing any VAS size as long as the GPR size corresponds to the maximum address size. Thus, having a hardware GPR size of 32 bits in a particular hardware model results in a current maximum address size of 31 bits. The 32nd bit (i.e. bit 0 of each address) is currently reserved for address interpretation, required by a few instructions supported by the system. Thus, the 32 bit size of GPRs participating in the B,X,D address arithmetic for operand data results in a 31 bit maximum effective logical address size. And the 31 bit address size currently results in a 2 GigaByte (GB) virtual address space (i.e. $2**31$) limit.

Hence, it was obvious that increasing the size of the GPRs would allow an increase in the size of the virtual addresses used for accessing operand data, such as by increasing GPR size to 64 bits from their current 32 bit size to increase the virtual address size to $263$ or $264$ bytes. Then a corresponding increase may be desired in the size of instruction addresses (e.g. to 63 or 64 bits from 31 bits) in the machine's PSW (program status word).

However, controlling how to handle an increase in the virtual address size is not obvious, and is the object of the invention in this application.

Although the previous virtual address size of 31 bits has been a practical limit on the maximum size of each VAS (virtual address space) in the IBM S/370 systems, the number of VASs usable by a single program was dramatically increased from one per system user to thousands per user by the ESA/370 access register (AR) architecture. ARs allow easy access to data in plural VASs by a single program, wherein data can easily be accessed in plural VASs, which may be different from the VAS(s) containing the instructions controlling the data. ARs were disclosed and claimed in U.S. Pat. No. 4,355,355 (Butwell et al) for accessing multiple virtual address spaces. An AR specified a VAS by specifying its segment table designation (STD). A family of 2 GB address spaces was provided to any ESA/370 program using the AR teaching of U.S. Pat. No. 4,355,355.

U.S. Pat. No. 4,979,098 (Baum et al) enabled use of a central depository of STDs in a system by using an AST (address-space-number second table), and improved the security for VASs designated by ARs by putting indirection between the content of an AR and its specified STD (defining the VAS). The valid ASN second table entries (ASTEs) in the AST (ASN second table) contained the STDs defining all virtual address spaces currently recognized by the system. Having a single table defining all virtual spaces in a system allows central control over their creation, deletion, and access authority.

Security is provided by the indirection between each AR and its STD that was obtained by using an access list (AL) having pointers to a subset of ASTEs containing the required STDs. The AL was located by a control register field. The AR was loaded with an access list entry token (ALET) for accessing the required VAS, instead of loading the AR with the required STD (which would prevent the control program from changing the location of the segment table). Nevertheless, the AR content (the ALET) still represented the STD. And non-supervisory users of a system are permitted to load and manipulate ALETS in ARs as if they are STDs to control the use of VASs in the system.

Each AL (available to a given user) must have its AL entries (ALEs) initialized to contain pointers to the ASTEs containing STDs that are to correspond to the ALETs available to a given user.

The ALET in an AR contains an access-list-entry-number (ALEN), an access-list-entry sequence number (ALESN) and a primary list bit (P). The ALEN indexes into the AL for selecting a required ALE (access list entry). The ALE content points to a particular ASTE (ASN second table entry) which contains the STD represented by the AR.

The process of following an ALET's indirection path from the AR to its STD is called the AR translation (ART) process, which includes validity and authority checking. The validity checking uses the ALESN (ALE sequence number) in the ALET to protect the program from inadvertently attempting to use an ALE after it has been reassigned to a different STD (the same ALET with a different ALESN value), since an equal-comparison in needed to obtain access. And if the ALESN fields compare-equal, then ASTESN (ASTE serial number) fields in the ALE and in the ASTE (ASN Second Table Entry) are compared during the ART (AR translation) process and they also must be equal to enable access to the STD in the ASTE. The ASTESN (ASTE sequence number) protects the system where reassignment of an ASTE has occurred from one STD to another, for example.

The above stated acronyms are defined in pages 5–23 thru 5–53 in the prior publication entitled "IBM Enterprise Systems Architecture/370 Principles of Operation" (form no. SA22-7200-0).

The ART process is completed when it accesses the STD corresponding to the ALET in the AR. An STD is comprised of a STO (segment table origin) for locating a segment table (ST), and a STL (segment table length). A respective page table is located through each ST entry (STE).

The ART process is speeded up by using an ALB (ART lookaside buffer) to store the results of an ART operation, i.e. the ALET and the ALET's resulting STD. This ALB entry is accessed by the ART process the next time the ALET in the AR is accessed to more quickly obtain its STD.

After the ART process obtains the required STD, the conventional DAT (dynamic address translation) process is started for the VA, for which the VA indexes into the addressed ST to find a page table (PT), and the VA then indexes into the PT to obtain a required page table entry (PTE) containing the page frame real address (PFRA) that represents the translation of the VA (which locates the required page in real storage).

Accordingly, an ALET (through its STD) locates a segment table that represents a 2 GigaByte (GB) virtual address space, which is accessed for translating 31 bit virtual addresses to real addresses in the ESA/390 architecture.

Nevertheless, the use of the AR architecture effectively exceeds the 31 bit virtual address limit (while using 32 bit GPRs) by providing a virtual extension in the AR associated with the B-GPR specified in the current B,X,D operand field of a data address. The 31 bit address plus the AR extension are used to represent a virtual address of up to 48 bits (the 31 bit VA + the 16 bit ALEN + 1 P bit).

Thus, the 32 bit GPR size is not changed by the AR architecture, when it enables the 31 bit VA size to support a family of up to $2^{}16=65536$ virtual address spaces, in which the size of each virtual address space is $2^{}31=2$ GigaBytes. This resulted in each application program having a total virtual space capacity of $2^{}47$ bytes of data in its maximum number of $2^{}16$ address spaces per access list.

The ALET in an AR defines a 2 GB virtual address space. The ALET has three fields: a 16 bit index value called an ALEN, an 8 bit sequence number called an ALESN, and a primary list bit P, which selects between two access lists. The ALEN is an index into an access list (AL) to select an entry (ALE) that points to an entry in another table called an AST. The ALESN is a sequence number used to check whether the AR is to be permitted to access the ALE, and protects a program whose operation has caused reassignment of an ALE from use of an incorrect ALET. An ASTESN field in an ALE is used during the ART process to check whether or not an AR is to be permitted to access an ASTE through the specified ALE. Access is permitted only if the content of the ASTESN field of the ALE matches the ASTESN field in the ASTE. A 31 bit address in an ALE locates the ASTE containing the required STD. The ASTESN field of an ASTE can be changed to prevent a match, thereby withdrawing authority from ALEs currently addressing it, and requiring that they obtain authorization before their next access is allowed to that ASTE.

U.S. Pat. No. 4,355,355 (Butwell et al) discloses access registers (ARs) for enabling ease of use of a plurality of address spaces by an application program.

U.S. Pat. No. 4,979,098 (Baum et al) discloses and claims access register translation (ART) using an indirection through an access list (AL). A token (ALET) is provided in an AR to represent a segment table designation (STD). An index (ALEN) field in the AR accesses an entry in the AL to obtain a pointer to the ASTE containing the STD. A pair of sequence numbers (ALESN and ASTESN) variously placed in the ALET, in the ALE and in the ASTE provide authority control over the accessing of the STD. The STD accessing used one of plural ALs selected by the setting of a P bit also in the ALET in the AR. With this patent, a program using ARs has access to a family of virtual address spaces through the ALETs provided to the program to represent the address spaces available to the program.

U.S. Pat. No. 4,679,140 (Gotou et al) describes increasing the GPR size from 32 up to 64 bits for generating 48 and 64 bit addressing. A mode register is associated with each GPR to indicate if it contains a 32, 48 or 64 bit address when it is being used as a B or X register, to maintain downward compatibility with 32 bit addressing. A 64 bit address arithmetic circuit is used with the 64 bit GPRs and is controlled by the mode bits which determine whether 32, 48 or 64 bit arithmetic is to be used. This Gotou patent does not disclose the large virtual address concepts taught in the subject application.

U.S. Pat. No. 4,868,740 (Kagimasa et al, 1987 priority) discloses and claims a program status word (PSW)

extended address mode for 48 bit addresses, as an alternative for 31 bit addresses. This Kagimasa patent does not disclose the large virtual address concepts taught in the subject application.

Japanese application 63-305443 filed Jun. 8, 1987 discloses virtual addresses having a high-order family (F) field used as an index into a table of STOs to find a required STO. This Japanese application does not disclose the large virtual addressing concepts taught in the subject application.

Concurrent U.S. patent specification Ser. No. 07/754,810, filed Sep. 4, 1991, entitled "Method and Means For Addressing a Very Large Memory", and assigned to the same assignee as this application, does not disclose the invention of the subject application, but discloses and claims how a small real address (e.g. 31 bit) for addressing a small real memory (under 2 GB) can be converted into a large real address (i.e. 64 bits) for addressing a large memory (over 2 GB), while maintaining upward compatibility for old S/370 programs. It also discloses and claims how the DAT and/or ART process for small VAs can be used in the generation of large real addresses (LRAs) provided as the translations of the small VAs.

U.S. patent specification Ser. No. 07/754,810 generates an LRA by concatenating a predetermined extender which defines a 2 GB section of the real memory. A 2 GB memory boundary is crossed (when the conventional 32 bit address generating adder using 31 bit B and X general register values and a 12 bit displacement value) overflows into its highest order bit position zero, which increments the extender by one. This may be done by using the overflow bit content to interrupt the current program and invoke the control program to perform this incrementing.

SUMMARY OF THE INVENTION

This invention deals with the problem of raising the limit on the size of virtual and real address spaces in a machine which may be running in native mode. Native mode virtual addressing uses single-level DAT, compared with guest/host operations which may use two-levels of DAT. For example, the virtual address may be extended to 63 bits, compared to the present 31 bit addresses found in IBM mainframes, while maintaining compatibility with the current 31 bit virtual addressing (which uses a segment table (ST) that provides up to a 2 GigaByte virtual address space in ESA/390 and S/370). Compatibility with current access register (AR) architecture is obtainable with this invention.

The current 31 bit limitation on virtual addressing is caused by use of 32 bit GPRs for B and X operand values with 32 bit arithmetic circuits (31 address bits and a sign bit). But after the virtual address (VA), itself, is extended to greater than 31 bits, the problem exists of how a large virtual address (LVA) is to be mapped into a large memory. It is this latter problem that is solved by this invention.

This invention modifies the current access register (AR) architecture. This invention has discovered a different way to generate an index (ALEN) for selecting an entry (ALE) in an access list (AL) that replaces the need for an ALEN in an ALET in an access register (AR). The AR ALEN is replaced by a high-order field in a LVA generated by address arithmetic on an B,X,D operand using greater than 31 bit GPRs. This high-order field includes the LVA ALEN of this invention. Previously, the AR ALEN was generated by the operating system as part of an ALET for use in an AR. The program had to specifically load the ALET into an AR in order to have addressability to the 2 GB represented by the ALET. With the subject invention, the LVA ALEN is a function of the address value (unlike an AR ALEN).

In this invention, each large virtual address space (LVAS) is represented by a contiguous set of ALEs in an access list (AL). Each ALE represents a 2 GB address space unit in an LVAS, so that each LVAS is a multiple of 2 GB, except its last ALE which can represent less than 2 GB of valid address space by invalidating segments and pages in its segment table and page tables. The user may use an LVAS comprised of any number of contiguous ALEs in an AL. The non-used ALEs in an AL may be marked invalid, or the number of ALEs for an LVAS may be defined by a descriptor in another table. The maximum virtual address space available to a program (user) is $2**N$, where N is the number of bits in the LVA.

In some embodiments of this invention, the LVA contains a still-higher-order field than its ALEN field. This still-higher-order field is herein called an ADEN (access directory entry number) field, which locates the ALs accessible to a user. The ADEN field is used for selecting one of a potentially large number of ALs which may be located anywhere in the system memory. The ADEN indexes to an access directory entry (ADE) in an access directory (AD). The content of each ADE locates a respective AL in memory which has a contiguous set of ALEs representing part of an LVAS (large virtual address space). The ADE may contain an offset field to the first ALE, in the specified AL, of the consecutive ALEs (comprising the part of the LVAS in the AL) so that this portion of the LVAS need not start with the first ALE in the respective AL. Efficiency considerations will govern the selection of the particular bit lengths for the LVA ALEN and ADEN fields. The size of the ALEN field controls the maximum number of ALEs allowed in a single AL. And the size of the ADEN field controls the maximum number of ADEs allowed in a single AD. It is possible to have a defined field in an AD entry that is used to indicate that a sequence of ADEs form a single, unique LVAS (similar the use of the ALESN field to distinguish different LVAS' in an AL defining more than one LVAS). Thus, the definition of AD's can be extended to include more than one LVAS in a single AD.

Hence, the smaller the ALEN field, the smaller is the number of 2 GB address space units allowed in an AL and therefore in the portion of an LVAS contained in the AL. Decreasing the size of the ALEN field may allow a corresponding increase in the ADEN field to increase the number of ALs forming a single LVAS.

This invention can use an LVA ALEN field of any length, but the use of a 16 bit LVA ALEN field in the LVA enables compatibility with current ESA/390 access register (AR) architecture by enabling the 16 bit LVA ALENs to use the current access register translation (ART) process in the ESA/390 AR architecture. The AR translation (ART) process accesses a segment table (ST) represented by the LVA ALEN value for use in a DAT translation operation of the low-order 31 bits of the address (representing a 2 GB address space). In this special case, the LVA length is $16+31=47$ bits. A 47 bit LVA can locate any byte in up to a $247$ byte LVAS, which has a size up to 65,535 times the current 2 GB address space. A 63 bit LVA can locate any byte in up to a 263 byte LVAS, which has a size up to 4,294,967,296 times the current 2 GB address space.

Accordingly, this invention enables computers to be built and programmed to support very large size logical addresses which include large real addresses (LRAs) and large virtual addresses (LVAs) for enabling executing programs to access data anywhere in a very large single address space which exceeds 231 bytes, and, for example, may have a maximum of 263 bytes when using 63 bit virtual addresses. Also, this invention allows any computer program to use a large number of separate smaller virtual address spaces, LVASs, that are smaller than the maximum 2**63 byte space allowed to the programs, but the invention allows each of the LVASs to have a size that may be much larger than the previous maximum of 2 GB. And, each LVAS has its 4 KiloByte pages dynamically allocated in a real memory of the computer by using the dynamic paging of the conventional DAT (dynamic address translation) process used by computers built to the current IBM ESA/390 and S/370 architectures. It is therefore an object of this invention to enable LVAs to maintain compatibility with the DAT used by prior small virtual addresses (e.g. 31 bit virtual addresses currently used in large IBM mainframes) while greatly extending the address spaces available to a program.

For the purposes of this invention, a "small address" is the 31 bit address length currently used in IBM mainframes supporting an address space of 231 bytes or less (e.g. also 224 bytes). This invention defines a large address as having more than 31 bits and thus is capable of supporting an address space of more than 2**31 bytes.

A characteristic of the current 31 bit small address is that it wraps back to address zero when incremented beyond its 231-1 limit. For example, if it is then incremented by one, it wraps back to address location zero. But when a large address has value (231-1) and is incremented by 1, it merely goes to its next value of 2**31, whereby the large address does not wrap back to zero but continues to increase with further incrementing.

This invention discovers that a high-order field in a large virtual address (LVA) can be handled like an access register (AR) ALEN (in the ALET of the AR). In the special case where this high-order field is defined to contain 16 bits, the LVA ALEN can be handled by the current ESA/390 access register translation (ART) process, even though the LVA ALEN is derived differently than an AR ALEN.

This invention changes the way a user handles the address spaces available to a program. Previously, a user would explicitly load into an AR a specific ALET representing a required 2 GB address space pointer. With this invention, a user would no longer need to be aware of the existence of address spaces, and therefore no longer needs to explicitly handle ALETs. Instead, the user merely addresses operands in programs in the same manner that users have previously addressed program operands without concern for AR ALET manipulation, as in the accessing of single 2 GB address spaces, because these large virtual addresses can be automatically handled by the subject invention without user concern, and even without user awareness.

Thus, the LVA ALEN field (sometimes with the LVA ADEN field) permits the computer hardware and software to automatically handle address space accessing as a part of handling ordinary operand specifications without user concern. System control program software (OS) needs to setup the entries in the ALs (and in any AD) in preparation for large LVA use by a user program, which also may be done automatically without user awareness.

When an operand specification is being calculated in a computer, the LVA is automatically generated without user awareness, and the LVA ALEN value is automatically obtained from the LVA to select the required ALE in the AL. The OS previously had filled the corresponding ALE with a pointer to a corresponding ASTE containing the STD that respectively corresponds to the LVA ALEN value. That is, this OS preparation is done before the use of the LVA begins. It is because of this OS preparation that the LVA ALEN may directly receive the ART type of process. The OS preparation process was used to enable AR-specified 2 GB address space addressing of ESA/390. For an LVAS, more than one ALE is initialized, each pointing to a different ASTE, providing an LVAS consisting of multiple 2 GB spaces. This provides programs addressability to logical objects larger than 2**31 bytes.

In more detail, the invention divides a large virtual address (LVA) into at least two fields: a low-order field (handled by conventional DAT), and a high-order field starting at the bit after the low-order field to the left, arithmetically. Since the LVA may be any size greater than 31 bits, its low-order field is the low-order 31 bits of the LVA, and its high-order field ends with the bit position immediately to the left of the low-order field. This low-order field is hereafter referred to as the DAT field in an LVA.

The high-order field may be further divided into at least two fields: a low-order LVA ALEN field, and a high-order ADEN field. The LVA ALEN field is always used for an LVA, but the LVA ADEN (access directory entry number) field may or may not be used in various embodiments of the invention. The ADE may contain more than one field, such as an ALO address field for locating the corresponding AL, an offset field to the first (smallest index) ALE representing the LVAS and an LVAS length field specifying the number of contiguous ALEs comprising that LVAS.

Each ALE (in the set of ALEs representing an LVAS) represents a 2 GB portion of the LVAS on 2 GB virtual memory boundaries. The LVA ALEN value accesses the ALE required by the LVA value. The content of the accessed ALE points to an ASTE entry containing the STD required for locating the ST needed for translating the respective LVA. Then, DAT is performed on the low-order 31 bit part of the LVA (using the ST accessed through the STD, and the PT accessed through the appropriate STE) to translate the LVA to a real address (which is used to access the byte location in the memory being addressed by the LVA value).

Any LVAS may be smaller than its 2**63 byte maximum by the system OS marking invalid all ADEs, ALEs, STEs, and PTEs not being used for the LVAS.

A sequence number (SN) may be associated with each LVAS to protect it from an improper access. To do this, a unique SN may be associated with all ALEs forming each LVAS, such as by including the SN in an AR associated with a base address in the B-GPR of the LVA operand, and by storing the same value in an ALESN field in each ALE representing that LVAS, so that an SN match is required before access is allowed for the LVA in the LVAS. This will prevent a program from being able to use an ALE that does not represent the LVAS, as might occur if the user program specifies an LVA designating a location outside of the LVAS, by causing an unequal compare that ends the accessing process for the LVA.

This invention provides the same SN in all ALEs of the same LVAS, in order to authorize access to all ALEs of a single LVAS. If the SNs do not match, access to the STD in the addressed ASTE is inhibited. In addition to the ALESN, each ALE also contains an ASTE sequence number (ASTESN) which protects the system in the case of ASTE reassignment to a different 2 GB virtual area. An access to an ASTE through an ALE to obtain the STD of the 2 GB virtual area requires that the ASTESN field in the ALE match the ASTESN of the ASTE.

A central system table of ASTEs may be provided to contain all STDs recognized by a system, in which each ASTE contains a respective STD. Another sequence number (ASTESN) is also put into each ALE and in its corresponding ASTE; and they must match before access is allowed for an LVA. This will prevent an LVA from being able to use the STD in a reassigned ASTE. In this manner, access authority is withdrawn for an LVA permitted to access an ALE when its addressed ASTE has been reassigned to a different STD (or has been invalidated).

An alternate embodiment can treat the high order portion of the 64 bit general purpose register as an access register in a processor providing both the LVA mode and the access register mode as separate modes.

Concurrent application Ser. No. 07/754,810 to Baum et al discloses and claims extended real addressing greater than 31 bits (e.g. up to 63 bits). The real address (i.e. the translated address) resulting from an address translation of an LVA by this invention may be provided as a large real address (LRA) by using the invention of Ser. No. 07/754,810.

This invention provides an alternate real (absolute) address-generation to that found in application Ser. No. 07/754,810, is to use, when DAT is off, the B, X, D adder output that would be an LVA if DAT were on. The high order part of this logical address is concatenated at the left of the 31 bit low order part to form a large real address. Thus, this invention provides a means of using address generating circuitry (which, when DAT is on, forms an LVA) to also form, when DAT is off, a large real address by a process different from that used in application Ser. No. 07/754,810.

DETAILED DESCRIPTION OF THE EMBODIMENTS

Logical Address Generation

Figure 1:
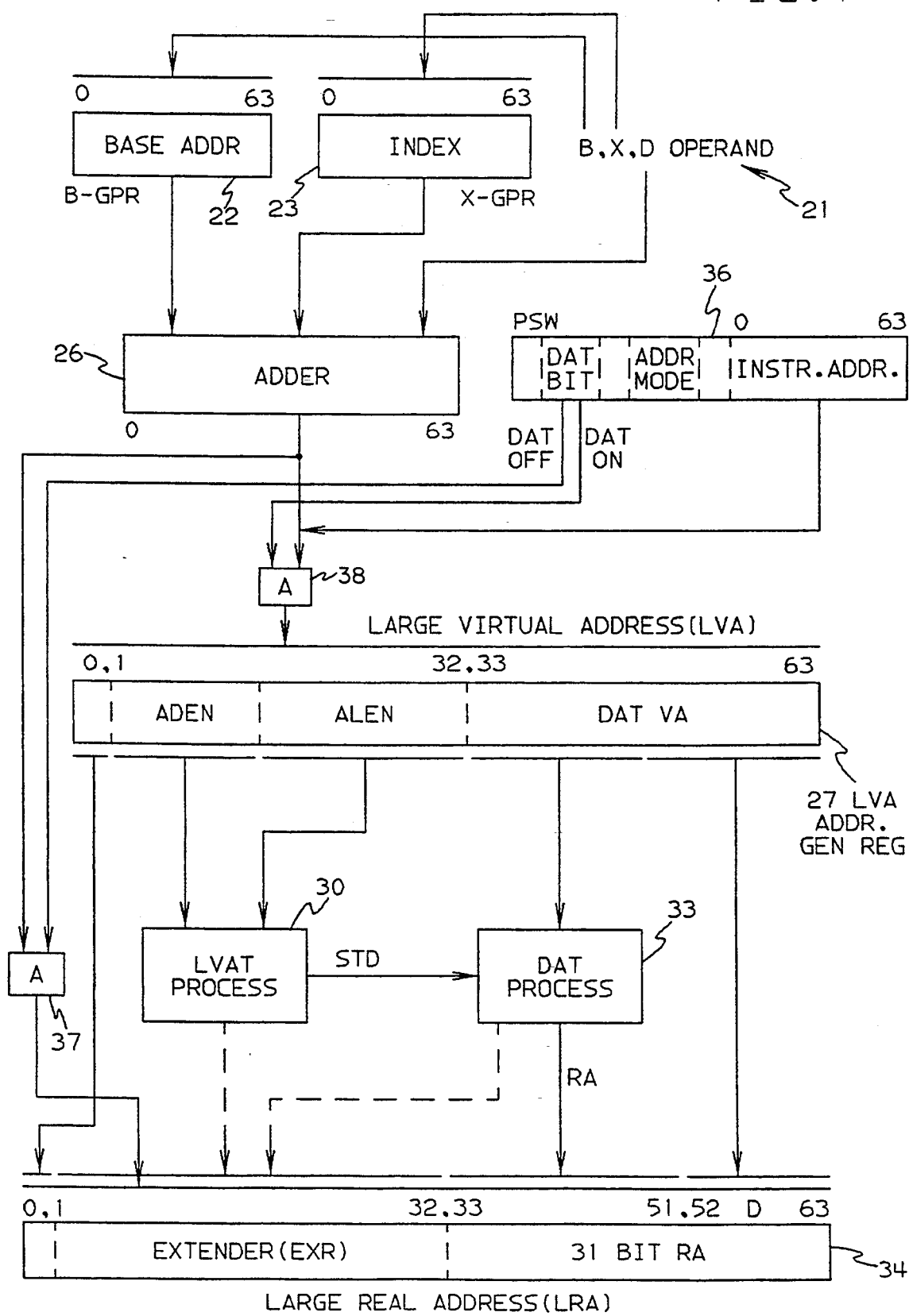
FIG. 1 represents the generation of a large virtual address and its ADEN, ALEN and DAT VA address components by address arithmetic from instruction specified operand address components, and the translation of the ADEN, ALEN and DAT VA address components to a large real address. The figure also shows the 64-bit output of the address computation adder being used directly as a large real address when DAT is off. Thus, the figure shows how this invention is used to provide large logical addressing instead of just large virtual addressing.

The operation of the embodiment in FIG. 1 starts with an instruction operand represented in the B,X,D form widely used in the IBM S/370, XA/370, ESA/370 and ESA/390 computer architectures for generating logical addresses for data in system main storage (main memory). These addressing components include B representing a designated base register 22 selected from 16 available general purpose registers, X representing a designated index register 23 of the 16 available general purpose registers, and D representing a displacement in a 4 KB page. These address components are used to generate a logical address by being applied to an adder 26 which performs the function (B)+(X)+D in which (B) and (X) are the contents of registers B and X, respectively.

The term "virtual address" as used herein includes any CPU "logical address" when the DAT ON state exists in the CPU's PSW (program status word) 36. And, any "logical address" is a real address when the DAT OFF state exists in the CPU. The PSW (or system control registers) have mode fields which indicate the size of the generated logical addresses.

The off state of the PSW DAT bit enables an AND gate 37 (and disables an AND gate 38) to gate the large address in adder 26 directly to a large real address register 34. This real address is then accessed in the system's main memory.

If the on state exists for the PSW DAT bit, AND gate 38 transfers the output of adder 26 (a 64 bit large logical address) into a 64 bit virtual address generation register 27.

Generation of Large Virtual Addresses (LVAs)—FIG. 1

The large virtual address (LVA) in register 27 is divided into at least three fields: ADEN, ALEN and a 31 bit DAT VA. The DAT VA field is in the lowest-order part of a 63 bit virtual address, occupying bit positions 33 through 63. The highest-order bit position 0 is a sign bit position for indicating whether the 63 bit address is positive or negative and has the same purpose as does bit zero in the conventional 31 bit IBM S/370 architecture. The sign bit is used in a limited number of instructions. The high-order bit positions 0 thru 33 contain two fields, ADEN and ALEN, provided by this invention. The boundary between ADEN and ALEN is arbitrary, and is controlled by reasons to be given later herein. The fields ADEN, ALEN and DAT VA are contiguous with each other in the 63 bit address. The DAT VA field is chosen to be the lowest-order 31 bits to make it compatible with currently used 31 bit VAs to allow current hardware and microcode designed for use with 31 bit virtual addressing to be used with the LVAs of this invention.

The B,X,D address generation described above is used for accessing data, but not for accessing instructions for execution. Instructions are accessed using an instruction address contained in the CPU's PSW 36; the instruction address is incremented to address each next instruction. The invention enables the use of the novel 63 bit virtual addresses for accessing operand data whether the instruction's PSW contains either the conventional 31 bit instruction address, or the novel 63 bit instruction address. A 63 bit instruction address is translated the same as a 63 bit operand address using the novel translation means disclosed herein.

In FIG. 1, both the 63 bit virtual addresses generated from B,X,D operands, and the 31 bit or 63 bit instruction addresses provided from the PSW, are inputted (with right-hand alignment) into register 27 for address translation.

Large Virtual Address Translation Means—FIG. 1

The address translation of an LVA is done using an LVA translator (LVAT) 30 and a dynamic address translator (DAT) 33. DAT means 33 may be the conventional hardware/microcode DAT means used in current IBM ESA/390 systems.

DAT means 33 is compatible with the translation of both conventional VAs (e.g. 24 or 31 bit) and LVAs (e.g. 63 bit). The difference is: with conventional VAs the DAT 33 provides the entire translation, but with LVAs the DAT 33 only provides translation for its lowest-order part (e.g. lowest-order 31 bits). This invention provides LVAT 30 for translating the high-order part of each LVA. This invention comprehends not only LVAT 30, but the combination of LVAT 30 and DAT 33.

Thus, LVAT and DAT processing translates an LVA into a real address (RA) that represents a byte location in any page frame in the system memory. Theoretically, any size RA may be used with this invention, such as a 31 bit RA. That is, 63 bit LVA could be translated by this invention into 31 bit RA, or into 24 bit RA, or into any other size RA capable of locating a byte address in the system memory. However as a practical matter, a 63 bit LVA may be so huge, and involve the timely use of such a vast number of page frames in real memory, that a 31 bit RA may not be capable of providing enough real page frames in memory to support efficient use of 63 bit LVAs without impacting system performance efficiency. For this reason, the preferred embodiment herein assumes use of a 63 bit real address as the translated address for a 63 bit LVA. But it should be understood that any size real address may be used with this invention and the size chosen is a matter of economic selection that does not restrict the use of different and varying size LVAs.

In this embodiment, the 63 bit real address allows the system memory to have a size up to $2^{}63$ bytes, which is vastly greater than the maximum $2^{}31$ byte size for conventional memories.

The preferred embodiment is structured to translate its LVAs into a 31 bit real address (RA) with extension to a larger size, e.g. 63 bits, as an integrated option where real storage exceeds 2 GB in size. The translation into 31 bit RAs permits compatibility with conventional 31 bit address translation tables (segment tables and page tables) which provide 31 bit RAs and are currently programmed into a large number of commercial S/370 systems. These 31 bit tables are part of DAT 33. Their resulting 31 bit RAs are converted into larger, e.g. 63 bit, RAs by use of an invention described and claimed in U.S. patent application Ser. No. 07/754,810 entitled "Method and Means for Addressing a Very Large Memory" which is owned by the same assignee as the subject invention. The conversion to a 63 bit RA 34 is accomplished by concatenating a 32 bit extender to the high-order end of each 31 bit RA.

Of course, the segment and page tables could be built to use any size real address, and the 31 bit choice is a matter of economic evaluation, with consideration of comparability with previous hardware and software systems.

The resulting 63 bit RA obtained with the LVAT/DAT process is preferably stored in a translation lookaside buffer (TLB) of the conventional type used in current commercial IBM ESA/390 based systems, except for requiring more bit positions to accommodate representations of the large 63 bit RAs instead of representations of the 31 bit RAs used in prior systems.

Figure 2:
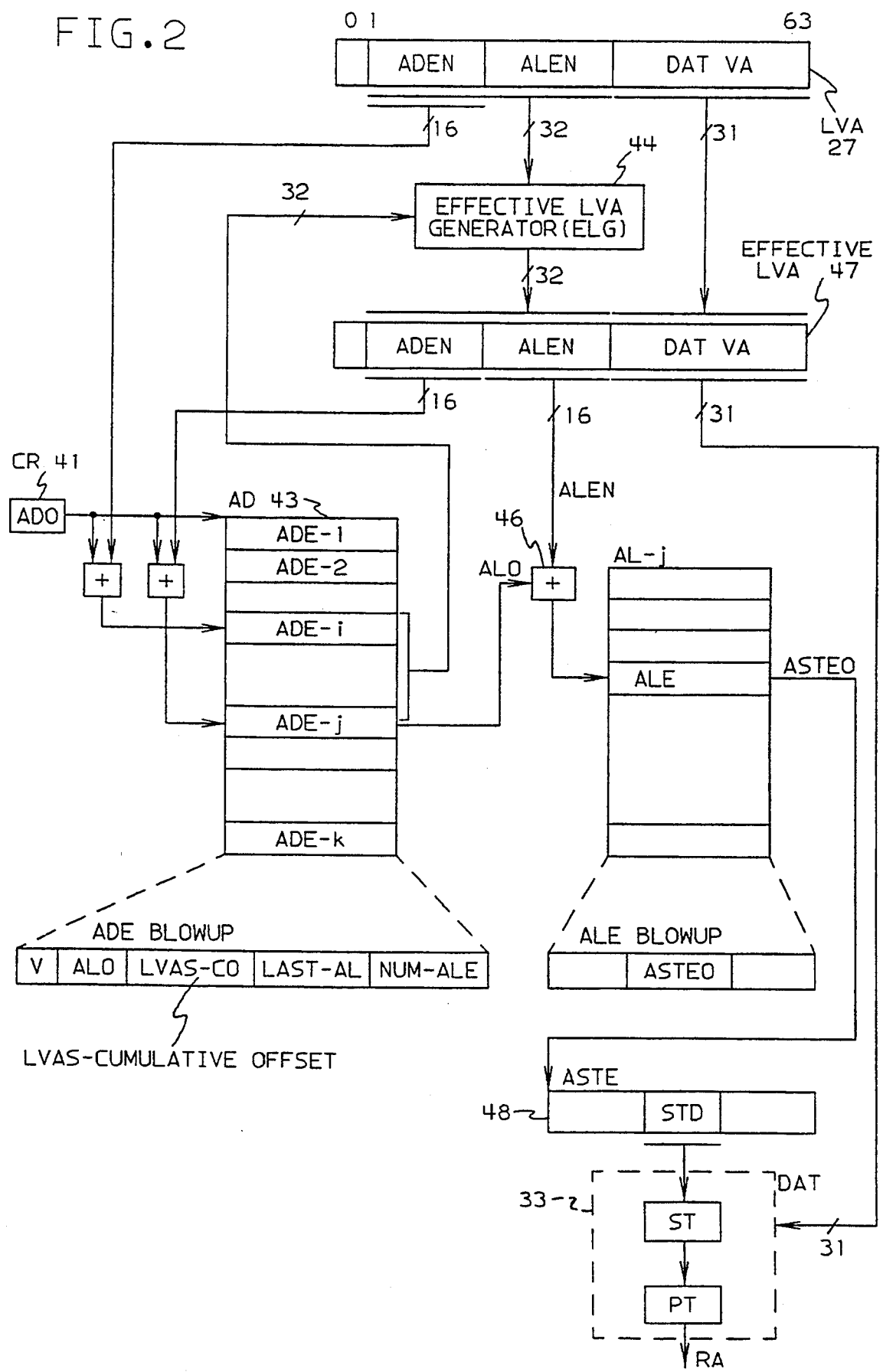
FIG. 2 provides a representation of the large virtual address translation (LVAT) and DAT processes.

Large Virtual Address Space (LVAS) Controls in FIG. 2

FIG. 2 represents the LVAT process, which starts with the 63 bit LVA put into the 64 bit address generation register 27. The LVA in address generation register 27 is divided into the fields: 0, ADEN, ALEN and DAT VA. The contents of the ADEN, ALEN and DAT VA fields provide the address components inputted to the LVAT 30 and DAT 33 processes for performing each large address translation. The 0 field is not used in the address translation process.

The LVAT process uses an access directory (AD) 43 to define each LVAS. AD 43 is located in system memory by a real address (AD origin, ADO) stored in a control register (CR) 41. A different ADO is loaded into the CR when a different LVAS is to be accessed. Thus a plurality of ADs are used to define a plurality of LVASs, but only one AD is accessed at a time in FIG. 2.

Each AD is comprised of one or more AD entries (ADEs —ADE-1 through ADE-k, each of which contains an ALO real address for locating in memory of any one of AL-1 through AL-k. Hence, each valid ADE defines a respective AL, through which an access list (from the set AL-1 through AL-k) is accessed. The ADEN value in the LVA currently in register 27 is used as an index into the AD for selecting a particular ADE-j and its associated AL-j.

The content of an ADE is shown in a blowup diagram in FIG. 2 as containing the following fields: a valid (V) field, an ALO (access list origin) field, LVAS-CO (LVAS cumulative offset) field, a LAST-AL field, and a NUM-ALE (number of ALEs) field.

The valid (V) field contains a bit that indicates if the content of the ADE is valid to indicate which entries in the AD are not part of the LVAS. The ALO (access list origin) is the real address of the beginning of the AL represented by the ADE. The cumulative offset field (LVAS-CO) is the total number of ALEs not used as part of the LVAS for this and all preceding ADEs, cumulatively.

This set of ALs has a particular number of ALEs, which include all ALEs in the LVAS. However when an offset is used, less than all ALEs in the set are included in the LVAS, since the offset ALEs in each AL are not included in the LVAS (the ALs within the offset may be reserved for a use unrelated to the LVAS).

The number of ALEs used by an LVAS in each AL of the set is determined by the maximum value of the ALEN field (determined by the number of bits in the ALEN field) and the individual offset of that particular AL. The total number of ALEs in an LVAS is determined by the value of the concatenated ADEN and ALEN fields (providing a 32 bit value to an ELG 44 in FIG. 2).

Hence, an LVAS uses only those ALEs located in its ALs between the offset and the end of the AL, except for the last AL of the LVAS which uses only the number of ALEs in the NUM-ALE field beginning at the offset in the AL.

The use of offsets does not affect the total number of ALEs required to represent an LVAS. Each ALE of an LVAS represents another 2 GB of address space in the LVAS in the sequence of the ALEs in the LVAS. However, a non-zero AL offset field in the associated ADE reduces the number of ALEs available in that AL for use by the LVAS. The sequence of ALEs used to maintain the correct sequence of virtual addresses in an LVAS requires that the ALE following the last ALE of an AL (other than the last AL of the set) be the ALE located at the offset location in the next AL of the set (which is the first ALE of the LVAS in the next AL in the set). This "next AL" is specified in the next contiguous ADE (the one following the current one in the AD defining the LVAS).

The number of ADEs in the AD may also be increased to accommodate the number of ALs required in the set. An LVAS-CO (LVAS cumulative offset) field in each valid ADE is initialized to a value which is the total of all offsets in the associated AL and in all preceding ALs defining the LVAS. The LVAS-CO is calculated by adding the number of ALEs in the offset of the associated AL to the value in the LVAS-CO field in the immediately preceding ADE.

This ALE reduction per AL, and the possible increase in the number of ADEs (and ALs) to accommodate the effective ALE reduction per AL for the LVAS, causes a complication in locating the correct ADE (for locating the correct AL), and for locating the correct ALE in the correct AL.

To obtain the location of the correct ALE, an adjustment is required to values of the ADEN and ALEN fields in the LVA. This adjustment is done in FIG. 2 in which an "effective LVA" is created to modify the ADEN and ALEN fields of the current LVA 27 to locate the correct ALE. An "effective LVA generator" (ELG 44) is provided in FIG. 2 to perform this adjustment to the ADEN and ALEN fields.

The operation of finding the correct ALE is first to use the ADEN in the LVA 27 to locate a trial ADE, which outputs its LVAS-CO field to ELG 44. The ELG 44 adds the value of this LVAS-CO to the high-order 32 bits of the original LVA 27 (which are the concatenation of the ADEN and ALEN in LVA 27). A comparison is made between the ADEN in LVA 27 and the ADEN in the effective LVA 47. If they are equal, this is the correct ADE. If an unequal condition occurs, a following ADE is then being addressed, and its LVAS-CO value is accessed and provided to ELG 44. It is added to the original high-order 32 bits of LVA 27. If the resulting ADEN in the effective LVA 47 is equal to the ADEN in the last effective LVA 47, the correct ADE is being currently addressed. If an unequal condition again occurs, this process is repeated until an ADE is accessed which has an LVAS-CO that causes an equal condition. Then the last ADE (currently in the effective LVA 47) is the correct ADE for selecting the correct AL. And the last ALEN (currently in the effective LVA 47) is the correct ALEN for selecting the correct ALE in the addressed AL.

ALEs Reserved by LVAS-CO Field

Use of the LVAS-CO field in each ADE can reserve a set of ALEs in the top part of each AL (containing the low numbered ALEs) for use for other purposes than for the LVA translation purposes of this invention. For example, the current ESA/390 access register architecture uses the first two ALEs in each AL for special operations. The LVAS-CO field can maintain compatibility in the use of this invention by restricting it to the ALEs above the reserved boundary, while allowing use of ALEs below the reserved boundary for a prior use by preventing the first. X number of ALEs in each AL from being used in any LVAS definition.

LVA Translation Process in FIG. 2

An ADO is initialized in the CR 41 prior to beginning execution of any program requiring translation of any LVA, in order to locate the AD which defines the LVAS which contains the LVAs in an executing program.

When each B,X,D or B,D operand large virtual address (or instruction large virtual address) is provided during program execution, its LVA is put in register 27.

The ADEN field in register 27 is added to the ADO value in CR 41 to obtain the address of the ADE required in the translation of the LVA in register 27. The ADE is accessed in memory.

The V bit in the ADE is checked. If it indicates the ADE is valid, the LVAS-CO in this ADE and the following ADEs are used in the manner described above to obtain the correct ADE. The ALO in this ADE is used to access the correct ALE in AL-j required for the translation of the LVA in register 27.

The ASTEO content of the correct ALE is used to access the ASTE containing the STD required for the LVA translation.

Then, the STD is used in a conventional DAT translation process 33 using the lowest-order 31 bit part of the LVA (providing its DAT VA part), in which the conventional segment table index (SX) and page table index (PX) are obtained from the DAT VA and used to access the STE and PTE required for the translation. The accessed PTE contains the page frame real address (PFRA), which locates the page frame in the real memory required by the translation process.

Then, the lowest-order 12 bits in the DAT VA 31 bit part are used as an index in that page frame to address the byte in real memory representing the translation of the LVA in register 27 using 31 bit real addressing.

If the memory uses larger than 31 bit real addresses, the 31 bit PFRA is extended by the means disclosed and claimed in U.S. patent application Ser. No. 07/754,810.

Overflow characteristic of the ALEN and ADEN fields (FIG. 2)

The incrementing or decrementing of virtual addresses through an LVAS (large virtual address space) causes its DAT VA field to eventually cross a 2 GB boundary, either when the DAT VA field reaches an all ones value (its highest value) and is further incremented, or reaches an all zeros value (its lowest value) and is further decremented. The crossing of a 2 GB boundary by the DAT VA field is manifested by it overflowing (+1) or underflowing (−1) to the ALEN field. Each change causes ALEN to select another ALE in an AL.

It is this overflow/underflow characteristic that obtains automatic generation for the greater than 31 bit part of a large virtual address. This is not a characteristic of the ALEN field of an ALET used for access registers (ARs) which are generated by the control program and cannot change when its DAT VA 31 bit address reaches a 2 GB boundary. That is, this invention automatically adjusts the ADEN and ALEN values as a result of an application program's use of large addressing without any conscious effort on the part of the application program, and without any ALEN or ADEN generation on the part of a system control program. Instead, the ALEN and ADEN are an integral part of an LVA and take part in virtual address computation.

Thus, the ADEN and ALEN components are automatically generated as part of the LVA specified within an application (problem state) program. They are not generated or managed by a system control program. The control program only sets up the AD and AL tables for use by the ADENs and ALENs, and this would be needed whether the ADEN and/or ALEN were automatically generated or generated by a control program.

When the access registers (AR) in the prior art are used, the ALEN value in an ALET can not receive any overflow or underflow from the DAT VA part of a virtual address. With an AR, overflow results in the 31 bit virtual address resetting itself back through zero, and underflow results in the 31 bit virtual address setting itself through its highest value (all ones). Hence, even though a VA using an AR may be considered a 47 bit VA (since it has a 31 bit DAT VA and a 16 bit ALEN) such a so called large virtual address cannot cross a 2 GB boundary in a large virtual address space (i.e. having greater than 231 bytes) as a result of address computation for a single instruction. The DAT VA portion of the address is calculated module 231 in AR addressing.

Thus, this invention uses the overflow characteristic to remove the burden of generating ALENs from the system control program. Further-, the invention provides the still higher-order ADEN address component which also uses the overflow and underflow characteristics inherently provided by address arithmetic when used across all bits of an LVA to avoid requiring ADEN generation and management by the control program. (ADENs have not previously been used with or without ARs.) This overflow characteristic permits a program to uniformly address a virtual object which is greater than 2 GB in size, e.g. a very large table of data values, without regard to an artificial 2 GB boundary.

Accordingly, the invention makes the ALEN sensitive to the DAT VA overflow/underflow where previously there was no sensitivity by ALENs in ARs. The consequences of using address arithmetic for ALENs (and ADENs) will become clearer as the embodiment in FIG. 3 is discussed herein.

Figure 3:
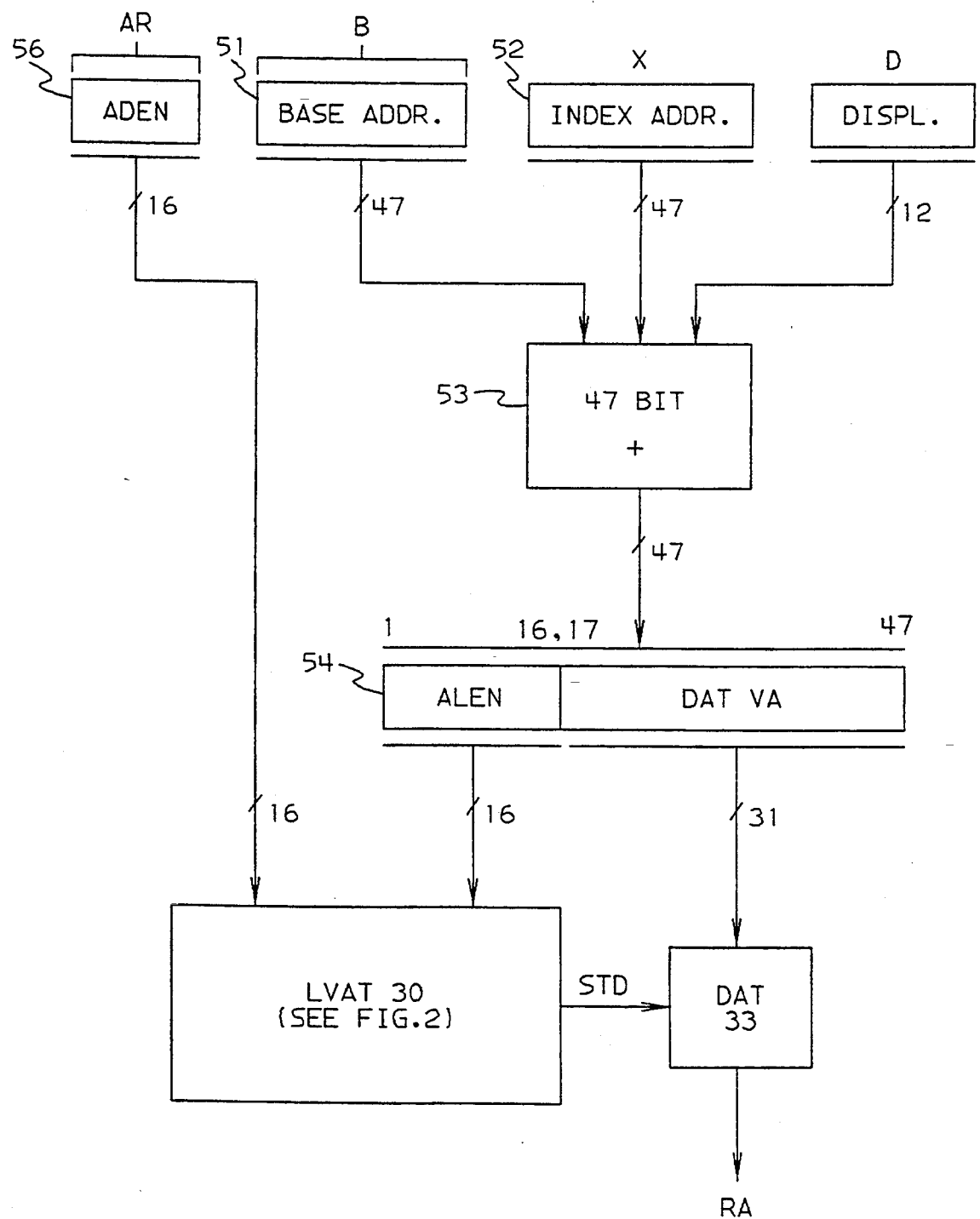
FIG. 3 generates the ALEN and the DAT VA by the address arithmetic process but provides the ADEN in an access register (AR).

Sensitive ALEN and Insensitive ADEN (FIG. 3)

This invention applies to an ALEN generated by address arithmetic, regardless of whether the address uses an ADEN or not. And this invention applies when the ALEN is generated by address arithmetic and the ADEN is not, such as when the ADEN is controlled by an access register type of process; this is shown in FIG. 3.

In FIG. 3, the address generation process assumes 48 bit GPRs are used in the CPU. This makes each base register 51 and index register 52 a 48 bit register, since the CPU in the preferred embodiment uses its GPRs as B and X registers. (It is realized that the invention can as well apply to a CPU which has dedicated base and index registers.)

A 47 bit address arithmetic adder circuit 53 receives the address of the B and X registers 51 and 52, as well as the 12 bit D field 57 in the current operand of an instruction being executed. Adder 53 performs three-way addition of its B and X register inputs and its operand-derived D input to generate a 47 bit LVA which it outputs to a 47 bit address generation register 54.

The LVA is outgated as two fields, a 31 bit low-order DAT VA field and a 16 bit ALEN field. The 31 bit low-order DAT VA field is provided to the conventional DAT (dynamic address translation) means 33, and the 16 bit ALEN field is provided to the ALEN input of the LVAT 30 which may be the same as the LVAT 30 shown in FIG. 2.

Overflow/underflow can occur from the DAT VA field into the ALEN field in the addition process within adder 53, so that the ALEN is automatically generated by the address generation process.

The 47 bit LVA size in register 54 may be increased to an LVA having a 63 bit size by effectively concatenating an ADEN field contained in an access register (AR) 56 associated with the B register to the highest-order end of the 47 bit LVA in register 54. Effective concatenation of the ADEN field is done by providing the ADEN content in the AR to the ADEN input of the LVAT 30 (which may be the same as described in FIG. 2).

However, the ADEN field in AR 56 is not part of the address arithmetic operation in adder 53, so that no overflow or underflow can occur between the ADEN and ALEN fields of the LVA. That is, the AR does not participate in the address arithmetic process of adder 53. Whenever overflow or underflow occurs from the ALEN (beyond the 47 bits of the LVA in adder 53), it sets the 47 bit LVA in register 54 either back to zero or to its highest value, respectively. In this embodiment, address arithmetic is done modulo 2**47.

The non-overflow and non-underflow constraints caused by the ADEN being in an AR in FIG. 3 allow the LVAT 30 to access only one ADE in the AD and only one AL. This is because the ADEN value is fixed in its AR, so that the ADEN can not be changed as a result of address arithmetic. This AR constraint limits the ADEN translation access to only a single AL (regardless of changes to the LVA in adder 53). This is very different from the operation of the embodiment in FIG. 2 which allows changes to its LVA to change its ADEN and access any number of ADEs and ALs—up to a very large number (e.g. up to 2**16 ALs for a 16 bit ADEN).

Figure 4:
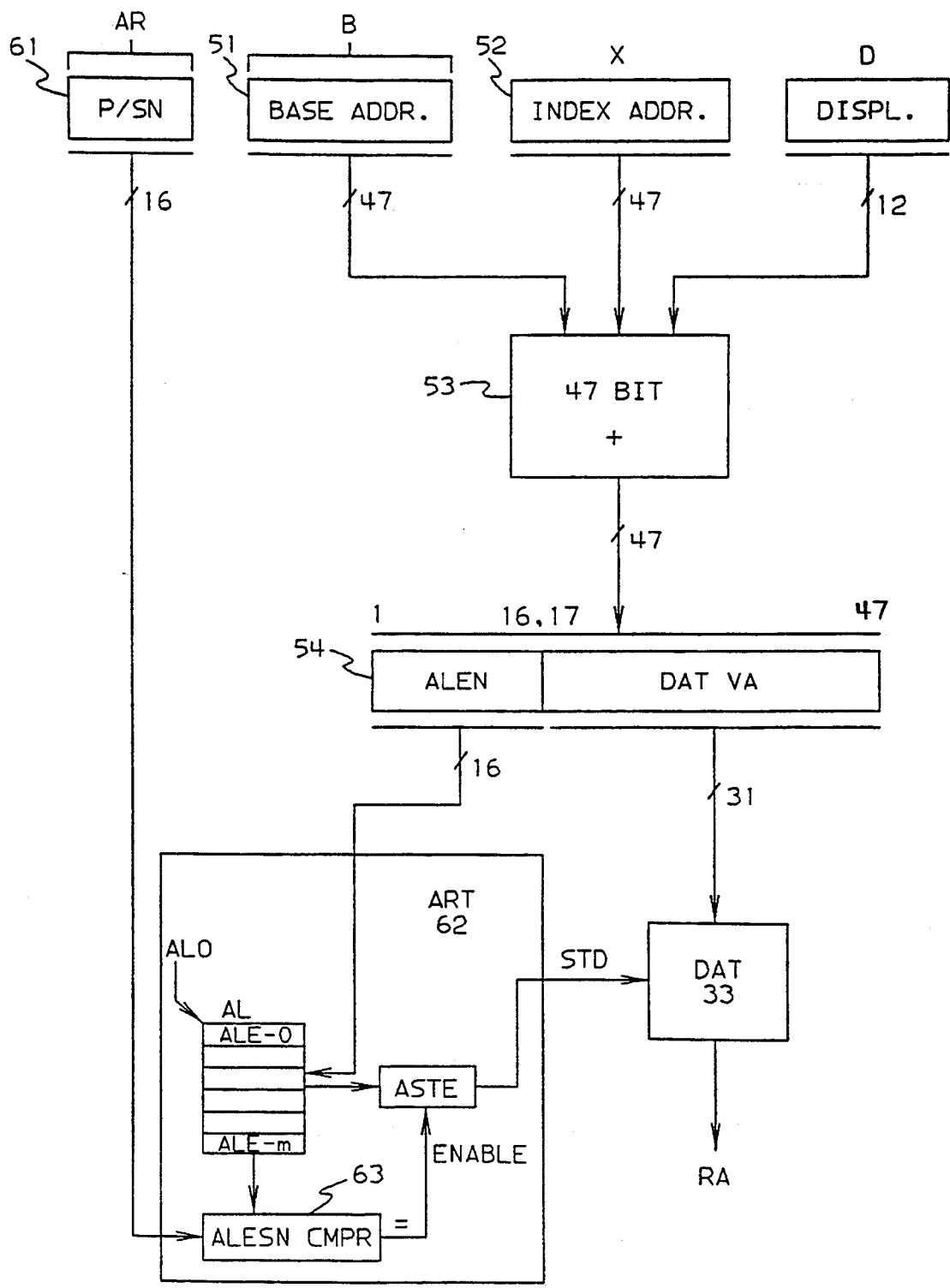
FIG. 4 generates the ALEN and the DAT VA by the address arithmetic process but checks the ALEN operation by a sequence number (SN) in an access register (AR).

Sequence Number Control of Sensitive ALEN (FIG. 4)

In FIG. 4, the novel-derived ALEN (obtained by the derivation process in FIG. 3) is combined with the conventional ART process. FIG. 4 also provides a sequence number (SN) and a P bit in an access register (AR) 61, which are coordinated with the overflow-/underflow sensitive type of ALEN provided by this invention from address generation register 54.

The P bit, SN and ALEN are inputted to and used by the conventional AR translation (ART) process 62 described in the ESA/390 Principles of Operation (form number SA22-7201-00).

The P bit value from AR 61 selects one of two ALO (AL origin) that locate particular ALs in memory. The ALEN from register 54 selects an ALE in the AL. The content of the ALE is shown in FIG. 4.

The SN from AR 61 is compared by step 63 to the ALESN in the accessed ALE. A compare-equal step 63 in the ART process 62 enables the remainder of the ART process. A compare-unequal condition for step 63 terminates the ART process and generates an exception for a condition code of an instruction having the current operand for which the ART process is being done.

The P bit and SN values are generated beforehand by the system control program in preparation for subsequent use by the ART process by a problem-state program.

Figure 5:
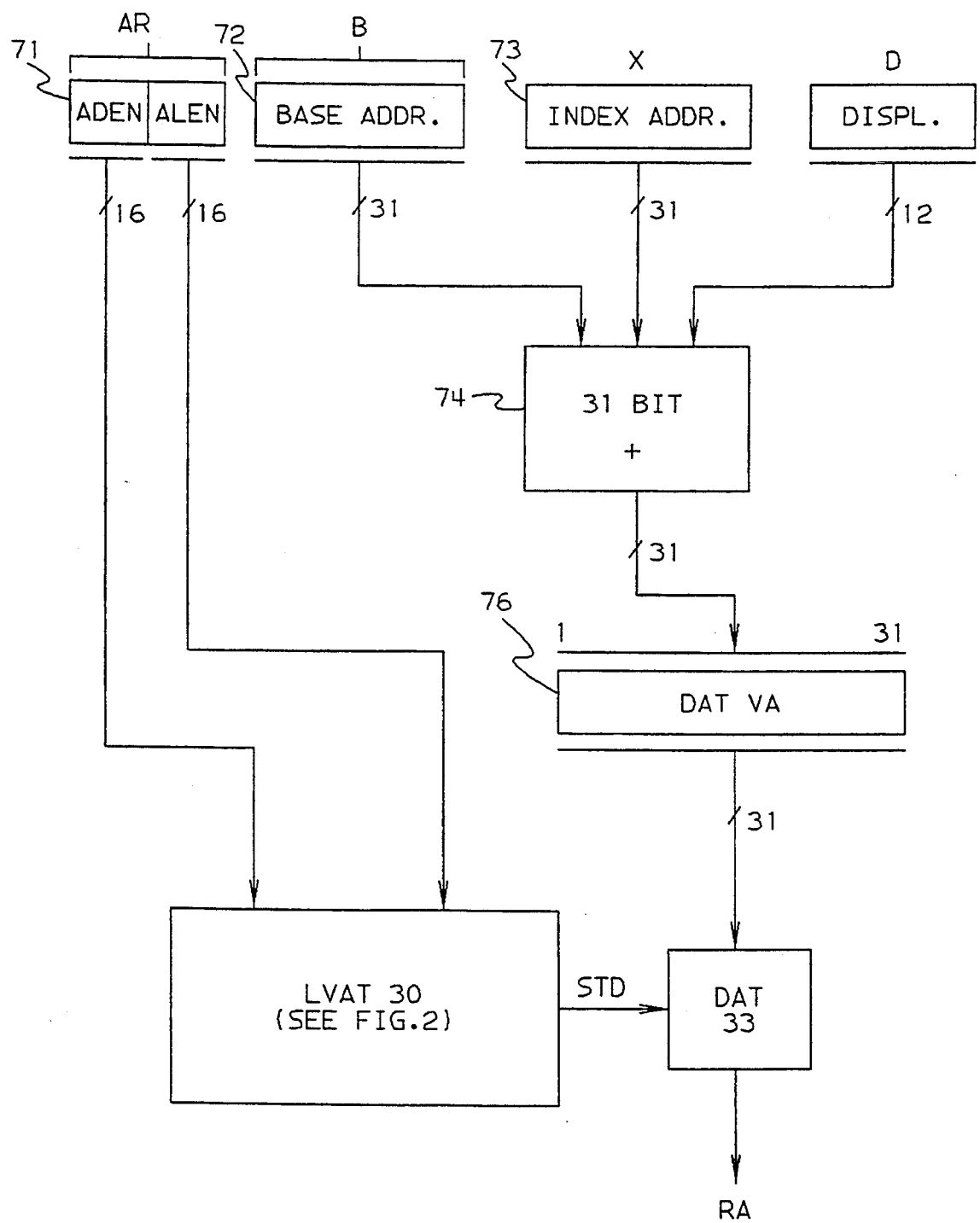
FIG. 5 represents the generation of a small 31 bit virtual address using ADEN and ALEN fields in an access register (AR) with the LVAT process of this invention.

LVAT Used With Insensitive ADEN and ALEN (FIG. 5)

In FIG. 5, the novel LVAT process 30 described in FIG. 2 is used in combination with insensitive ADEN and ALEN in an access register (AR) 71 associated with an operand-selected B register 72, which is a conventional 32 bit GPR in FIG. 5. Any used X register 73 is also a conventional 32 bit GPR.

The ADEN and ALEN values in FIG. 5 are generated beforehand by the system control program in preparation for subsequent use by the LVAT process 30 by a problem-state program.

Neither the ADEN or ALEN value can be changed while in the AR 71, which constricts the LVAT process 30 to selecting a single ALE. Contrast the single ALE selection in FIG. 5 with the single AL selection in FIG. 4 that allows a selection among 216 ALEs in the single AL. And further contrast the single ALE selection in FIG. 5 with the multiple AL selection in FIG. 3 that allows a selection among 232 ALEs in multiple ALs selectable by multiple ADEs.

The result of the constraint in FIG. 5 is to restrict its virtual addressing to within a single 2 GB address space. Its advantage over the conventional AR ALET operation is to allow a selection among up to 232 different 2 GB address spaces, rather than only among up to 217 with the conventional AR ALETs. An advantage of the system in FIG. 5 is that a conventional 31 bit adder circuit 74 may be used with a conventional 31 bit address generation register 76.

Large Virtual Address Space (LVAS) Definition in FIG. 2

Thus in FIG. 2, a large virtual address space (LVAS) is defined by a single access directory (AD) 43. The AD contains one or more contiguous ADEs that define one LVAS, in which the first ADE of the LVAS is the first ADE in the AD, and the LVAS contains each next valid ADE, and the LVAS ends when a valid ADE is reached having its "end" indicator set to a one state in its LAST-AL field (marking that ADE as the last valid ADE of the LVAS).

The sequence of ALs in an LVAS is determined by the sequence of contiguous ADEs comprising the LVAS in the AD. The ALs in an LVAS can have any sequence because each AL is independently addressed by the ALO field in the respective ADEs of the LVAS. Accordingly, each LVAS is comprised of the set of ALEs in the ALs defined by its ADEs. The ALEs of an LVAS are only contiguous within any single AL. Each ALE represents a 2 GB part of the LVAS. However, the size of an LVAS need not be an integer multiple of 2 GB, since the last 2 GB part of the LVAS can have any number of segments and pages marked invalid in the last parts of its segment table and page tables.

Figure 6:
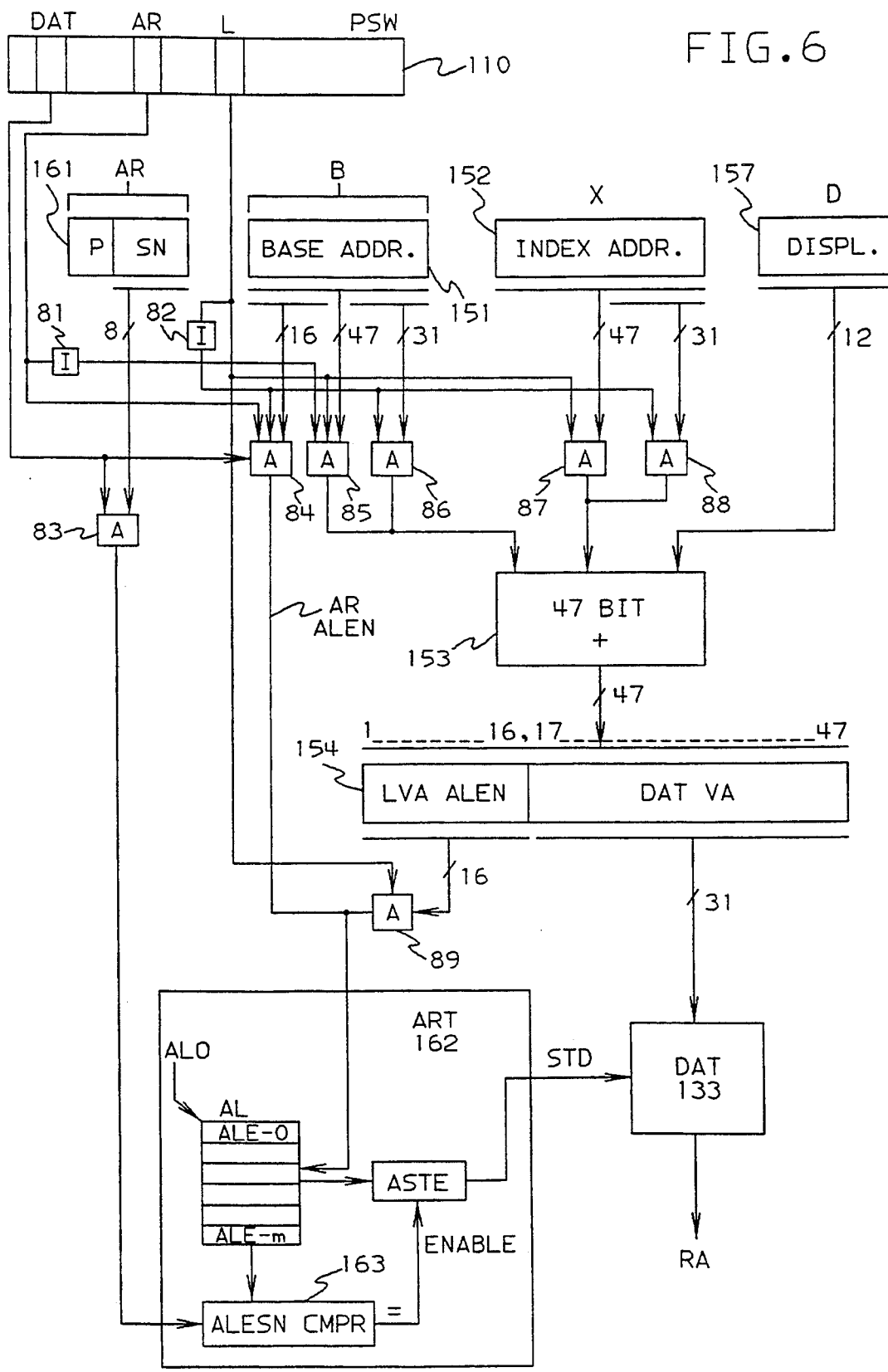
FIG. 6 provides an AR/LVA compatibility mode for a CPU which enables the CPU to operate in either the new LVA mode or in the prior AR mode, under control of special control bits in the CPU's current program status word (PSW).

AR and LVA Compatibility Control (FIG. 6)

The embodiment in FIG. 6, allows an instruction operand's virtual address to be handled in either the novel LVA mode or in the conventional access register (AR) mode.

Both modes are controlled by settings of mode bits in the current program status word (PSW) in the CPU. The PSW 110 in FIG. 6 includes the content of the PSW in the IBM ESA/390 architecture, but adds a large address control bit (L), which specifies the CPU is operating with greater than 31 bit addressing. The L bit operates in combination with a DAT mode bit in the PSW 110. When the L bit is on and DAT bit off, they enable the CPU to operate with large real addresses (LRAs). When both the L bit and DAT bit are on, they enable the CPU to operate with large virtual addresses (LVAs).

An access register mode (AR) control bit is provided in the PSW by the IBM ESA/390 architecture. When the AR bit is on, the CPU can use the content of an AR associated with any general purpose register when that register is used as a base register for an instruction operand. When the AR bit is off, the CPU operates without AR functions.

The three PSW control bits DAT, AR and L and associated new hardware make the CPU operations compatible with both the conventional AR operations and the new LVA operations. This permits old programs which use conventional AR operation to be able to be executed on the CPU. And new programs which use large virtual addressing can also be executed on the CPU.

Important to this compatibility in FIG. 6 is the outgating structure of base register 151, which is provided with two types of outgates. One type gates out a 47 bit large base address from base register 151. The other type gates out the content of base register 151 in two parts which are: a low-order 31 bits which correspond to a conventional small base address (like that obtainable from a conventional 32 bit general purpose register), and a high-order 16 bits, which represent an ALEN (like the type previously obtainable from an AR. Base register 151 may be a 64 bit general purpose register.

Thus, a conventional type AR content is obtained from the combination of the P bit field and SN field in AR 161, and the high-order 16 bits in the base register 151. (The SN field corresponds to the ALESN in the prior ARs.) This conventional type AR content is providable by the novel hardware shown in FIG. 6.

This preferred embodiment indicates the AR mode in the PSW by the combination of the DAT bit on state, the AR bit on state, and the L bit off state. In AR mode, the 16 high-order bits in register 151 are inhibited by AND gate 84, and the 31 low-order bits in base register 151 are outgated by AND gate 86 to adder 153. In AR mode, the index register 152 outgates only its 31 low-order bits through AND gate 88 to adder 153, which is then enabled by the L bit off state.

In the AR mode, the 47 bit adder 153 operates as a 31 bit adder since it is only receiving 31 bit values. And address generating register 154 generates only a 31 bit address, because it only receives a 31 bit value from adder 153. The high-order 16 bit LVA ALEN part of the address generating register 154 is not outgated to ART 162, because it is inhibited by the off state of the L bit in AR mode.

In both the AR and LVA modes of operation, an AND gate 83 outgates the P and SN fields to the ART (access register translation) means 162, since in both modes the outgate 83 is enabled by the DAT bit being on in the PSW.

The LVA mode in FIG. 6 operates in the manner previously described for FIG. 4. In LVA mode, the DAT bit is on, the AR bit is off, and the L bit is on. Then AND gate 85 is enabled by the on state of the L bit and the off state of the AR bit to provide a 47 bit base address in register 151 to adder 153, as in FIG. 4. Then, the on state of the L bit (through inverter 82) disables output gates 84, 86 and 88 to disable conventional AR operation. AND gate 87 is enabled by the on state of the L bit, causing the index register 152 to output its 47 bit content to adder 153.

Otherwise, the LVA mode operates as described in FIG. 4.

If a small translated real address is outputted from DAT circuit 133, it may be converted to a large real address by using the methods disclosed in patent application Ser. No. 07/754,810.

Although this invention has been shown and described with respect to plural embodiments thereof, it will be understood by those skilled in the art that various changes and omissions in the form and details of the invention may be made therein without departing from the spirit and the scope of the invention.

Having thus described our invention, what we claim as new and desire to secure by Letters Patent is:

1. A method of address translating large size virtual addresses (LVAs) for locating data and instructions a computer memory, comprising:
   indexing a highest-order part (ADEN) of an LVA into an access directory (AD) for selecting an AD entry (ADE), and accessing a cumulative offset field (LVAS-CO) and an access list origin (ALO) in the selected ADE;
   accessing an access list (AL) with the ALO, and indexing higher-order part (ALEN) of the LVA into the accessed AL to select an access list entry (ALE), said ALE representing a conventional virtual address sub-space in a large virtual address space;
   adding a value in the cumulative offset field (LVAS-CO) to a concatenation of the ADEN and ALEN fields in the LVA to obtain an effective LVA having a highest-order effective ADEN and a higher-order effective ALEN;
   comparing the highest-order effective ADEN to the ADEN in the LVA;
   using a last selected ADE selected by the last highest-order effective ADEN as a correct ADE if a compare equal condition is found by the comparing step;
   accessing a next ADE in the AD by incrementing the value of the current highest-order effective ADEN if the comparing step finds an unequal condition, and accessing a next LVAS-CO in the next ADE; and
   repeating the adding, comparing, using, and accessing a next ADE steps until a compare equal condition is found, said compare equal condition indicating the last effective highest-order ADEN provided by the adding step is to be used for locating a required AL, and a last effective higher-order ALEN provided by the adding step is to be used for locating an ALE in the required AL for accessing a conventional virtual address sub-space for completing the translation of the LVA to a real address.

2. A method of address translating large size virtual addresses (LVAs) being used by programs executing in a computer system, comprising the steps of:
   adding a content of an index register (X) to a content of a large base register (B) and a displacement (D) to generate at least a low-order part and a high-order part of a LVA, the low-order part having a size equal to a conventional virtual address (CVA), and the high-order part including an access list entry number (ALEN), said ALEN being utilized to locate a selected access list entry (ALE) from a plurality of ALEs, the ALEs representing different virtual sub-spaces in a large virtual address space (LVAS) addressed by the LVA, said LVA having more bits than found in a CVA;
   incrementing the high-order part represented by the ALEN when a carry signal is generated during the generation of the low-order part, said incrementing changing the ALEN, causing it change in the selection of an ALE, and a resulting change in the selection of a virtual sub-space in the LVAS;
   structuring the LVAS with a virtual address space granularity determined by the ALEs which define virtual sub-space granular units of the LVAS equal to the size of a conventional virtual address space (CVAS), said virtual sub-spaces having a size equal to the number of bytes equal to 2 to the power of the number of bits in a CVA;
   locating an access list (AL) in system memory at a location determined by an access list entry Origin (ALO); and
   selecting an ALE by indexing the ALEN into the AL, the selected ALE containing an address for locating an associated virtual address translation table for translating the LVA to a real address by translating the low-order part of the LVA to a real address, such that an address is accessed in the virtual sub-space defined by the selected ALE.

3. A method of address translating large size virtual addresses (LVAs) being used by programs executing in a computer system as defined in claim 42, further comprising the steps of:
   indicating in a field in a control register a choice between an LVA mode and an access register (AR) mode;
   when the indicating step indicates the LVA mode permitting any carry signal generated a result of the generation of the low-order part of the LVA to increment the high-order part of the LVA represented by the ALEN;

when the indicating step indicates the AR mode suppressing any carry signal generated as a result of the generation of the low-order part of the LVA from incrementing the high-order part of the LVA represented by the ALEN and performing a conventional AR translation (ART) operation.

4. A method of address translating large size virtual addresses (LVAs) being used by programs executing in a computer system as defined in claim 2, further comprising the steps of:

providing an access directory entry number (ADEN);

concatenating said provided ADEN with the ALEN part of the LVA higher-order part of the LVA;

utilizing said provided. ADEN to locate an access directory (AD) in system memory containing a set of access directory entries (ADEs), each ADE having an access list origin (ALO), wherein an ALO of an ADE locates an access list origin in system memory.

5. A method of address translating large size virtual addresses (LVAs) being used by programs executing in a computer system as defined in claim 4, further comprising the steps of:

providing a valid indication in one or more ADEs, said valid indication indicating if the content of an ADE is valid;

obtaining an ALO in a valid ADE for locating an AL in memory; and generating an exception signal if an invalid ADE is accessed.

6. A method of address translating large size virtual addresses (LVAs) as defined in claim 5, further comprising:

providing valid ALEs in a plurality of ALs for representing a single LVAS.

7. A method of address translating large size virtual addresses (LVA s) being used by programs executing in a computer system as defined in claim 4, further comprising:

each ADE containing an AL address field, wherein the AL address field contains an AL origin (ALO) and an offset field (LVAS-CO); and using the offset field to adjust the ALEN selection of an offset ALE in an AL for obtaining the ALE required for translating the LVA.

8. A method of address translating large size virtual addresses (LVAs) as defined in claim 2, further comprising:

a segment table being a conventional address translation table for translating virtual segments; and a plurality of page tables being represented by the segment table.

9. A method of address translating large size virtual addresses (LVAs) as defined in claim 4, further comprising the steps of:

providing an ADEN in an access register (AR) associated with a base register (B) utilized in generating an LVA.

10. A method of address translating large size virtual addresses (LVAs) as defined in claim 9, further comprising:

loading the ADEN into the AR from system memory prior to using the ADEN as a part of an LVA.

11. A method of address translating large size virtual addresses (LVAs) as defined in claim 10, further comprising:

providing the ADEN in memory by means of a control program prior to using the ADEN as a part of an LVA.

12. A method of address translating large size virtual addresses (LVAs) as defined in claim 4, further comprising the steps of:

providing a sequence number (SN) in an access register (AR) associated with a base register (B) of the generated LVA;

using the SN for comparison with a sequence number (ALESN) in an ALE accessed by the generated ALEN in a conventional ART process to permit the ART process to proceed only if a serial number compare-equal condition is obtained.

13. A method of address translating large size virtual addresses (LVAs) as defined in claim 12, further comprising:

having the SN unique to the respective LVAS; and verifying each access by an LVA by comparing an SN field of an accessed ALE with the SN in the AR.

14. A method of address translating large size virtual addresses (LVAs) as defined in claim 2, further comprising:

using a 64 bit adder for generating the LVA.

15. A method of address translating large size virtual addresses (LVAs) as defined in claim 2, further comprising:

using a 48 bit adder for generating the LVA.

* * * * *